(No Model.)
E. GOBBE.
MANUFACTURE OF WATER GAS.
No. 538,908. Patented May 7, 1895.
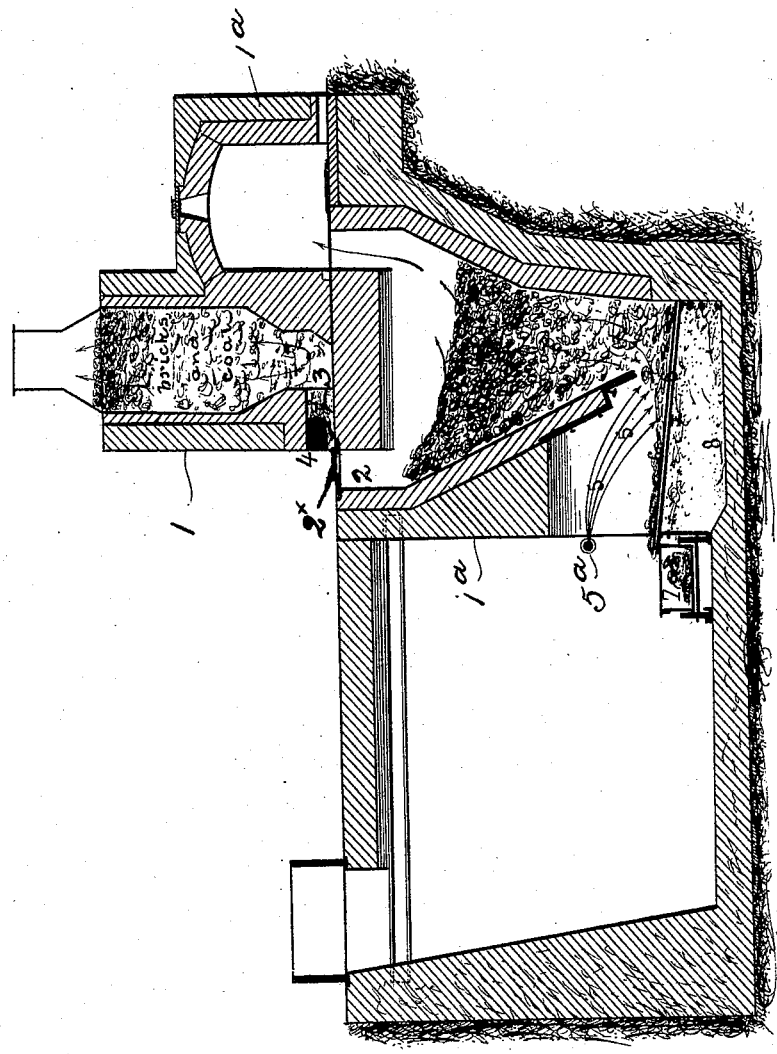
Witnesses
G. W. Rea.
Thos. A. Green
Inventor
Emile Gobbe,
By James L. Norris
Atty.

UNITED STATES PATENT OFFICE.

EMILE GOBBE, OF JUMET, BELGIUM.

MANUFACTURE OF WATER-GAS.

SPECIFICATION forming part of Letters Patent No. 538,908, dated May 7, 1895.

Application filed November 17, 1893. Serial No. 491,290. (No model.)

*To all whom it may concern:*

Be it known that I, EMILE GOBBE, a citizen of Belgium, and a resident of Jumet, Belgium, have invented new and useful Improvements in the Manufacture of Water-Gas, of which the following is a specification.

One of the principal methods known at the present time for the manufacture of water-gases consists in the injection of a certain quantity of steam or watery vapor, into the air which traverses the gas generators. This vapor is decomposed by contact with the coal, which is red with heat, and produces hydrogen and oxide of carbon, but by the decomposition of steam, a large quantity of caloric is absorbed and if the quantity of steam admitted with the air is too great, the action of the gas generator quickly becomes too slow. It follows that, in practice, it is impossible to admit more than a comparatively small quantity of steam, having a correspondingly limited effect upon the gas product, which contains about fifty per cent. of nitrogen under all circumstances.

My invention aims to provide a method of producing gas by which the heat in the generator may be maintained during the introduction of vapor of water, or steam, in the generators, whereby I effect, in a measure, the restitution to the combustible of the caloric absorbed by the decomposition of the steam.

It is my object, also, to produce a gas which shall contain the smallest possible percentage of nitrogen and be capable of yielding a high degree of heat.

My invention consists, for obtaining this result, in a method of feeding the gas generator by a mixture, in convenient proportions, of charcoal, and of stones, or other refractory material, mingled together, the refractory particles being of suitable size and heated to a high temperature by the combustion of a portion of the gas produced by said gas-generator, whereby such refractory material supplies the quantity of heat necessary for the decomposition of the steam, instead of absorbing this heat, as is the case in the generators hitherto used, from the combustion of the charcoal supplied to the generator.

The apparatus I am about to set forth in detail is used, in every case, for the purpose of maintaining the heat of the gas generator by the restoration to the generator of the heat absorbed by the decomposition of the injected steam. There are various methods possible for accomplishing this which are by no means foreign to, or outside the scope of my invention, though differing somewhat in their precise form and arrangement.

In the accompanying drawing I have illustrated in vertical section an apparatus designed to carry my improved method into effect, and it will be obvious that other apparatus differing in construction from that shown in the drawing may be employed to practice the method.

Referring to the drawing, the reference numeral 1 indicates a form of containing chamber, which is added to the generating apparatus and extends over the entire length thereof. Within said containing chamber, or chambers, which are built in the masonry $1^a$, refractory stones are introduced in pieces of such size as to form a bed which shall be easily permeable by the gas. These refractory stones will be heated, either by a part of the gas from the gas-generator, which may be allowed to escape in greater or less quantity through the charging opening 2, or by coal thrown by a shovel into the base 3 of the containing-chamber, or, finally, by both the methods mentioned operating together.

Air enters at the base of the containing chamber 1 through the opening 4, to support the combustion of the gas, or of the coal, and the heat thus generated will be absorbed by the refractory stones in the containing-chamber 1.

From time to time, after the stones at the base of the containing chamber 1 have attained a high temperature, they should be caused to fall, by the aid of a fork and in suitable quantities, into the gas-generator, together with the ignited coal lying in the base 3 of the containing-chamber, in such manner that the gas-generator will be fed with a mixture of coal and stones at high temperature, in which sensible caloric is, so to speak, stored up to be utilized in effecting the decomposition of the steam.

At the base of the gas-generator the stones will be cooled by the air which enters the generator and by a spray of water 5, issuing from a pipe $5^a$, by which steam will be formed. The grates 6, at the bottom of the generator are so formed and arranged as to serve as sifters so that when the stones are drawn from the bottom of the generator into the wagonette 7, the cinders and clinkers will remain underneath the grate, in the ash-pit 8. The wagonette 7 will be hoisted, by a lift of any suitable kind, to a point where its load may be returned to the container 1, as the stones may be used, in the manner described over and over again. This arrangement will permit the process to be carried on continuously through the agency of the refractory stones which serve as a vehicle to carry heat, into the interior of the gas-generator, this heat being acquired in a separate chamber by the combustion of part of the gas produced.

The loss of caloric will be inconsiderable, since the stones will absorb very nearly all the heat generated in the containing-chamber 1 and to heat a charge of the refractory material requires only a small volume of gas and will entail but little expense. The actual outlay will vary so far as regards the consumption of gas, from two to five per cent. of the entire weight of coal consumed in the gas-generator. This expenditure, on the other hand, will be fully compensated by the production of a better gas, which contains less nitrogen and will carry off a smaller quantity of the heat of the gas-generator to be lost in the gas-reservoirs.

The stones or other refractory material employed do not enrich the gas, but serve as a vehicle of heat for maintaining the temperature of the generator. In injecting steam into the air which passes through the gas generator, this steam produces hydrogen and oxide of carbon, and absorbs so much of the heat that a small quantity, only, of steam can be thrown into the ordinary generators. Now, if the generator is fed with coal, mixed with stones heated to a white heat before their introduction into the generator, the stones will maintain the heat in the coal by giving up their own heat in decomposing the steam. They thus serve to maintain a high temperature in the mixture of air, steam, and gases which passes through the generator. These stones do not produce, but simply restore heat which has been stored up in them in the chamber 1, where they are heated by a part of the gas produced by the generator, so that there is merely a transfer of heat, without material loss.

The stones are heated by part of the gas produced, which passes through the opening 2, the latter being opened more or less, as required. As the chamber 1 is directly over the generator and heated thereby, there is a considerable natural draft in said chamber. The exterior air is drawn in by this draft through the opening 4. The gas outlet from the generator below discharges upward directly in front of the opening 4, and is supplied with a damper, or cover, $2^x$, which is hinged upon the side farthest from the opening 4. By partly opening this damper it will be inclined in such manner as to direct the gas into the said opening 4, where it will enter mingled with the air drawn in by the natural draft. This draft will, in ordinary cases, be sufficient to insure the entrance of the gas and prevent it from passing to the external atmosphere.

The refractory stones mixed with coal will also have the advantage of forming a bed through which the gas can pass with ease. It will also be possible to feed the gas-generator with small coal which will occupy a part, only, of the spaces between the stones without choking the generator.

What I claim is—

1. That improvement in the manufacture of water-gas, which consists in maintaining the heat in the generator by heating a mass of granular refractory material to a high temperature, and charging the gas-generator from time to time with said heated refractory material mingled with coal, to restore the heat absorbed by the decomposition of steam, substantially as described.

2. That improvement in the manufacture of water-gas which consists in heating refractory material and fuel by the combustion of a portion of the gas produced in a gas-generator and feeding said heated refractory material and fuel from time to time to the generator, whereby said fuel and material are caused to restore their heat to the generator to replace the heat absorbed by decomposition of the steam or watery vapor injected and maintain the heat of the generator, substantially as described.

In testimony whereof I have signed this specification in the presence of two subscribing witnesses.

EMILE GOBBE.

Witnesses:
 W. JOUE,
 G. DELORN.